United States Patent Office 3,333,904
Patented Aug. 1, 1967

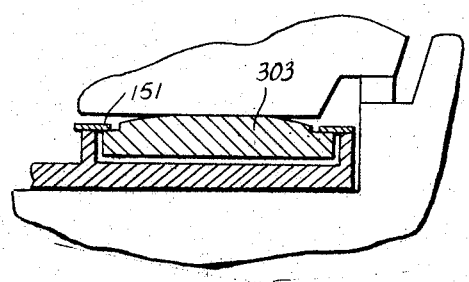
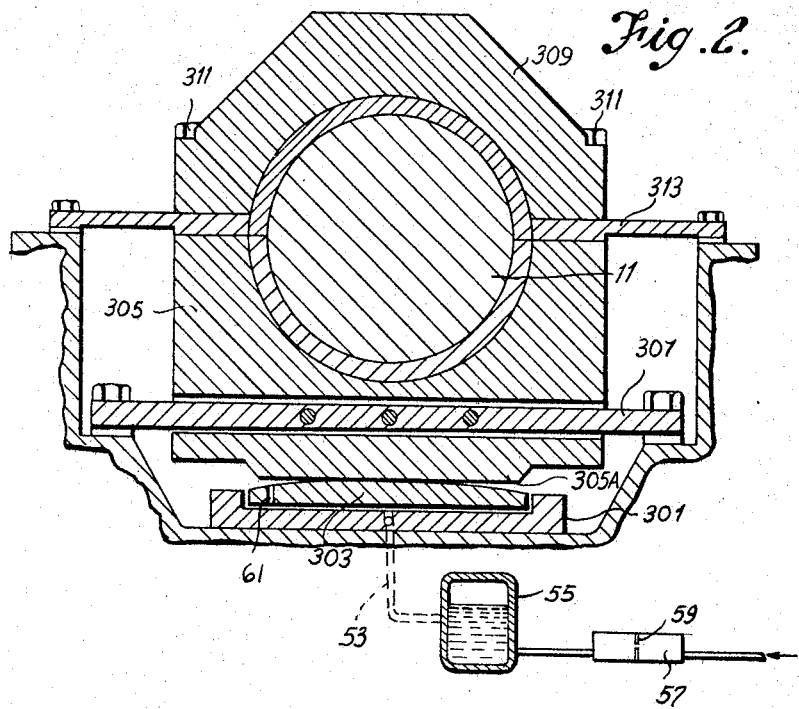

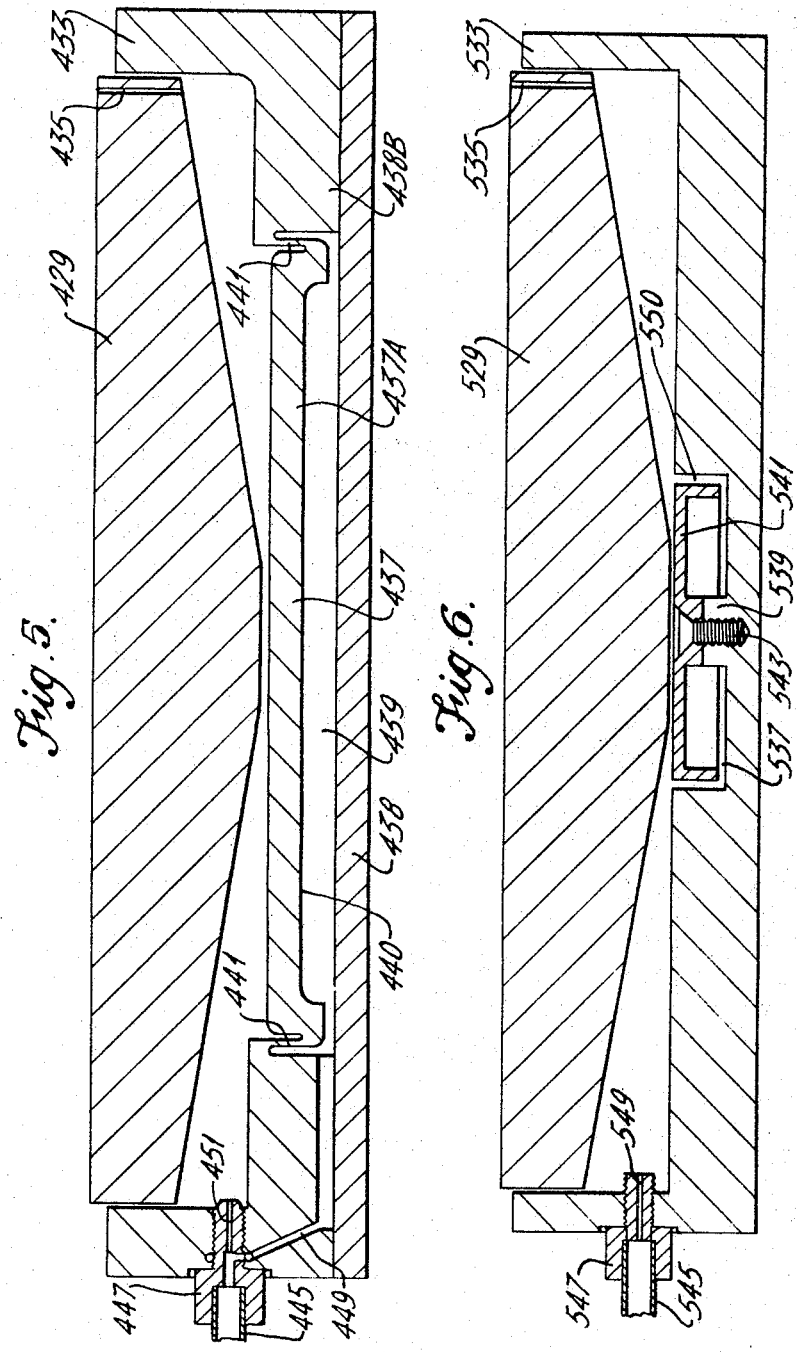

---

3,333,904
BEARINGS FOR ROTORS
Cedric Harald Flurscheim, Hale, and Adolf Frankel, Altrincham, England, assignors to Associated Electrical Industries Limited, London, England, a British company
Filed Nov. 6, 1964, Ser. No. 409,426
Claims priority, application Great Britain, Nov. 12, 1963, 44,630/63
7 Claims. (Cl. 308—9)

This invention relates to improvements in bearings for rotors, and finds particular application in the bearings of power generating apparatus including a large steam turbine driving an alternator.

It has become the practice in large output multi-cylinder steam turbines to mount the shaft contained in each cylinder on its own bearings, resulting in a total of $2n$ bearings per machine, if $n$ is the number of cylinders, each containing a separate shaft. In such machines of recent design the shafts are rigidly coupled together without any provision for misalignment except for the natural elasticity of the shaft material, and because of a number of design and economic considerations, including the need to keep the length of the machine as low as possible, it is customary to mount the bearings belonging to the adjoining ends of two consecutive cylinders in a common pedestal, with the distance between these bearings being kept as short as practicable. The same situation also applies between the turbine and the alternator, i.e., between the end bearing of the turbine on the alternator side and the end bearing of the alternator on the turbine side.

It can happen that in service one of these two bearings can become displaced in relation to the other, for example due to settling or distortion of the foundation block, differential thermal expansion of the bearing pedestal, which in turn can be due to asymmetrical radiation into the bearing pedestal from one side, one bearing running hotter than the other, coupling heating due to windage causing asymmetrical heating, and distortions of the pedestal under load.

As a result of the design practice described above, should one of these bearings become displaced relative to the other, even small relative displacements can cause a fairly far reaching re-distribution of the load between the two adjacent bearings, due to the short length and the great stiffness of the shaft between them. Such load re-distribution can ultimately lead to bearing failure or to rough running of the shaft system, caused for instance by alterations in the natural critical speeds of the shaft. The latter are of course a function of the shaft deflection curve, and of the detailed way in which the shafts are supported in the bearings. The relative bearing displacements which can cause such trouble are of a smaller order of magnitude than, say, permissible casing displacements in relation to the bearing pedestal. The latter only affect gland and blade clearances, so that in general such greater displacements can be tolerated.

An object of the present invention is the provision of an improved bearing arrangement by which limited displacement of the bearing housing can be accommodated.

According to the present invention, a rotary machine includes a rotor; a fixed bearing pedestal; an assembly of bearing blocks operatively engaging the rotor; hydraulic cylinder means arranged to act between the assembly of bearing blocks and the pedestal; at least one hydraulic cylinder, part of the hydraulic cylinder means, disposed below the assembly of bearing blocks and arranged to support the bearing blocks and rotor against vertically downwardly directed forces; anchoring means connecting the assembly to the pedestal and anchoring the assembly against horizontal transverse movement; and the anchoring means are resilient as regards vertical displacements of the assembly but are stiff as regards horizontal transverse movements.

The invention will now be described, by way of example, with reference to the accompanying drawings, in which:

FIGURE 2 is a sectional transverse elevation taken on the line II—II of FIGURE 1; and FIGURES 3 to 6 illustrate alternative constructions for a hydraulic cylinder shown in FIGURE 2.

Figure 1:
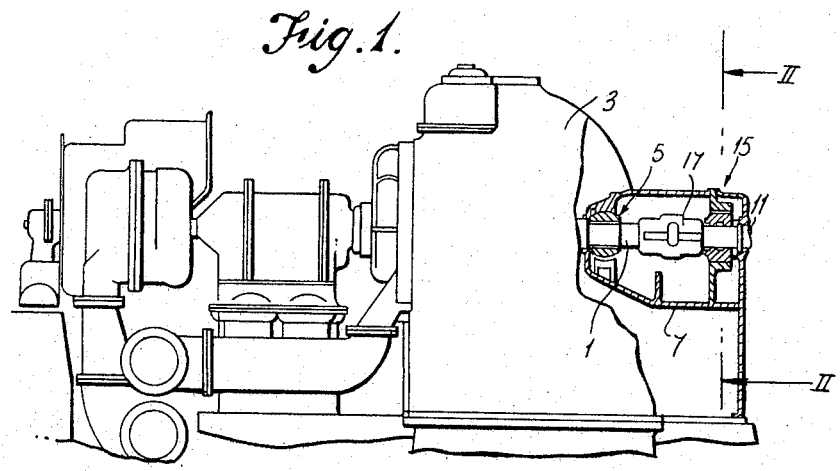
FIGURE 1 is a sectional side elevation of a coupling between one end of a low pressure turbine rotor and the adjacent end of the rotor of an alternator.

Referring first to FIGURE 1, the rotor shaft 1 of the turbine 3 is supported on a bearing 5 mounted in a bearing pedestal 7. The rotor shaft 11 of the associated alternator is supported on a bearing 15 also mounted in the pedestal 7. The adjacent ends of the two shafts 1 and 11 are coupled together by a muff-like coupling 17 formed in two parts, engaging respectively the two shafts, and coupled together by bolts. Each part of the coupling 17 engages a tapered end part of the associated shaft, and is formed with internal keyways which keys carried by that shaft engage. The bearing 5 is of the well known spherical seating type which can tilt to accommodate limited misalignment of the shaft 1. With such a bearing, however, even a small relative displacement of the two bearings in the pedestal will cause a major redistribution of the load between the bearings.

Referring now to FIGURE 2, this figure illustrates in detail the bearing 15, which includes an upper bearing block 309 and a lower bearing block 305, provided respectively with half linings which engage the shaft 11, the two bearing blocks being secured together by bolts 311. Instead of the lower bearing block 305 being mounted in an orthodox manner directly on the pedestal 7, it is supported on a piston 303 operating in a hydraulic cylinder 301. Piston 303 acts on a lower surface 305A of the lower bearing block 305, and biases the block upwardly. A spring plate 307 biases the bearing block 305 downwardly against the piston 303, and the bolts 311 pass through a second spring plate 313 clamped between the two bearing blocks. With this arrangement, the shaft 11 is held against lateral displacement by the spring plate 313 but can be displaced vertically relative to the pedestal by permanent forces arising from settlement by flexing of the spring plate 313. An oilway 53 communicates with the interior of the cylinder 301 and communicates with a gas-containing hydraulic accumulator 55. This accumulator is supplied from the oil circuit of the control system of the turbine through a pipe 57 provided with a small orifice 59 so that even when the oil pressure in control system is suddenly decreased following operation of the turbine trip system, a sufficient oil pressure is maintained in the cylinder 301 for a suitably long transition period. The cylinder is provided with a minute air bleed aperture from its uppermost point, as indicated at 61 in the piston 303.

During use of the turbine and alternator, the bearing 5 is fixed against all lateral movement, but the two connected bearing blocks 305 and 309 can be displaced by the shaft 11 relative to the pedestal 7 vertically through very short distances to accommodate any small displacement caused, for example, by settlement or shrinkage of the foundation of the alternator.

It will be appreciated that the bearing 5 is fixed in space, although it can tilt through a small angle, and by the arrangement of the bearing 15 so that it can be displaced, the bearing load is always shared in a desired proportion between the two adjoining bearings. Rotation of the blocks 305 and 309 with the shaft 11 is prevented by plate 307.

The small orifice 59 can be replaced, if desired, with a non-return valve, or both can be used together. The hydraulic accumulator 55 can be loaded alternatively with springs or weights. The arrangement of hydraulic cylinder and piston can be modified so that a flexible diaphragm connects the piston to the cylinder, so that leakage is impossible. In such an arrangement, the accumulator can be replaced with a sealed oil reservoir containing an inflatable gas bag, the pressure in the gas bag determining the oil pressure in the reservoir and thus in the cylinders. It would generally be desirable to allow only for relatively small vertical movement of the bearing, to the maximum extent of adjustment required in service, with suitable solid stops being reached when the movement exceeds these limits in either direction. These stops can be arranged in such a way that by the provision of suitable shims or jacking screws the bearing can be held rigidly in the correct position. This is desirable during the initial build and also for various checks when the machine is being serviced.

It is generally desirable, in order to preserve the dynamic characteristics of the bearing, to mount the bearing block as rigidly as possible, despite the hydraulic arrangement described above, and this can be achieved by providing as little as possible trapped oil volume inside the hydraulic cylinder and by feeding oil into it through restrictions of high impedance and/or through non-return valves. As a result of such an arrangement, although the oil supply and drainage from the hydraulic cylinder are quite adequate to allow the bearing block to adjust itself gradually into any new position required by altered running conditions (which is a process requiring lengthy times, running into minutes or more) such an oil volume will be dynamically very stiff in resisting high frequency displacements of the bearing block under the effect of shaft vibration. The latter is normally at the rotational frequency of the shaft, if the vibration is due to out-of-balance forces, and it is hardly ever lower than, say, 30% of the shaft rotational frequency, if the disturbance is due to dynamic conditions resulting from the hydraulic characteristics of the oil film and/or the whirling speed characteristics of the shaft. Any such vibration frequency will be extremely high in relation to the dynamic characteristics of the oil volume which is trapped in the hydraulic cylinder. A vibration of a given amplitude will cause reaction forces which are proportional to the pressure changes in the oil volume due to its being bodily compressed. For a given amplitude of vibration such pressure changes will be in the first approximation inversely proportional to the trapped oil volume, and for that reason, the smaller the oil volume the higher the dynamic stiffness of the whole bearing suspension system.

Figure 3:
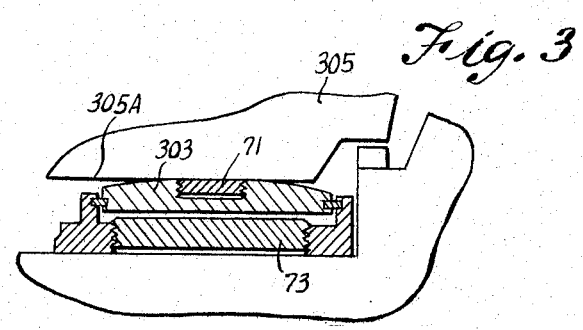

An arrangement in accordance with FIGURE 2 provides a neat and simple way of adjusting the dynamic response of the bearing system by changing the oil volume trapped in the hydraulic cylinders. This can be achieved as shown in FIGURE 3, by using suitable adjusting screws 71 and 73 which achieve the same effect. FIGURE 3 relates to an arrangement in which two cylinders and pistons replace the single cylinder and piston of FIGURE 1. As described above, a change in the oil volume trapped in the cylinder will change the dynamic stiffness of the shaft support at that point, and this in turn will affect the critical speed of the shaft system. This arrangement therefore provides a simple means of adjusting the dynamic characteristics of the machine during commissioning and this can be very useful. A similar effect can be achieved by adjusting the size of the orifice connecting the hydraulic cylinder volume to a source of pressure oil.

The piston surface is formed as a part-spherical surface of relatively large radius, and this accommodates any lack of normality between the surface 305A and the axis of the piston 303.

In FIGURE 4 is illustrated the manner in which an annular diaphragm seal member 151 can be used to make a fluid tight seal between the piston 303 and the wall of its associated cylinder, thus avoiding the need for the piston ring shown in FIGURE 3 and reducing the accuracy required in the matching of the piston and cylinder.

It is important that air bubbles shall be exhausted from the various cylinders in the embodiments of the invention described above, and it has been found that such bubbles will not be trapped on a surface which is inclined at 10 degrees or more to the horizontal. It is therefore desirable that the various oil spaces shall have their upper surfaces inclined at an angle of more than 10 degrees to the horizontal, to avoid trapping of air bubbles.

Referring now to FIGURE 5, this is a sectional transverse elevation of an alternative construction of the hydraulic cylinder 303 of FIGURE 2. In FIGURE 5, the lower bearing block is supported on piston 429 operating in a hydraulic cylinder 433. The lower surface of the piston 429 is sloped upwardly towards its periphery in order that, as set out in the preceding paragraph, bubbles of gas may not be trapped on its lower surface, and a plugged bleed hole 435 is provided near the periphery of the piston. The bottom of the cylinder 433 is formed by a stiff diaphragm 437 which will deflect under pressure and provide additional flexibility in the support of the bearing block. A cover plate 438 is bolted to the lower end of the cylinder 433 and defines, below the diaphragm 437, a lower oil filled chamber 439. The diaphragm 437 is in the form of a steel end wall recessed at 440 on its inner face to provide a central region 437A of lesser thickness and joined to the outer rim 437B of the end wall by a part 441 which supports the periphery of the central region 437A in the direction of the axis of the cylinder 433 but permits contraction and expansion of the rim of region 437A as that central region is deflected axially by the difference between the oil pressures respectively on its two faces.

An oil supply pipe 445 is connected to a restrictor member 447 mounted in the wall of the cylinder 433, and through the restrictor is connected by a passage 449 of relatively low fluid impedance to the chamber 439 and through a narrow passage 451 of relatively high impedance to the space above the diaphragm 437.

In use of the arrangement shown in FIGURE 5, in the presence of a steady load on the piston 429 the pressures respectively above and below the diaphragm 437 will be equal, and the diaphragm will carry no load. As regards vibrational loads of relatively high frequency, the pressure above the diaphragm will fluctuate in unison with the vibrational load but the pressure below the diaphragm will assume a substantially steady mean value. In this manner, the volume of oil required to accommodate a given vibrational load, and thus the overall dimensions of the cylinder, can be appreciably reduced.

Referring now to FIGURE 6, this shows an arrangement in which the desired additional flexibility to accommodate appreciable vibrational loads is obtained by the provision in the hydraulic cylinder of a gas pocket. The lower bearing block is supported on piston 529 operating in a hydraulic cylinder 533. The lower surface of the piston 529 is sloped upwardly towards its periphery in order that, as set out in the preceding paragraph, bubbles of gas may not be trapped on its lower surface, and a plugged bleed hole 535 is provided near the periphery of the piston. The bottom of the cylinder 533 is formed by an end wall in which is formed a central recess 537 having a central spigot 539. A bell 541 is located completely within the recess 537 and is secured to the spigot 539 by a screw 543. An oil supply pipe 545 is connected to a restrictor member 547 mounted in the wall of the cylinder 533, and through a passage 549 in the restrictor of relatively high fluid impedance is connected to the inside of the cylinder. The narrow annular gap 550 around the bell 541 serves as a flow restrictor.

When the cylinder is filled with oil, some gas is trapped underneath the bell 541, and when the oil is pressurised, this gas is compressed into the upper end of the bell. During use of the bearing, in the presence of a steady load on the piston 529 the pressures respectively above and below the bell 541 will be equal. As regards vibration loads of relatively high frequency, the pressure above the bell will fluctuate in unison with the vibrational load and there will be a flow of oil into and out of the lower end of the bell. In this manner, the volume of oil required to accommodate a given vibrational load is appreciably reduced. Since the narrow annular gap 550 serves as a flow resistor, the flow of oil into and out of the bell is damped.

What we claim is:
1. A rotary machine including:
  (a) a rotor;
  (b) a fixed bearing pedestal;
  (c) an assembly of bearing blocks operatively engaging the rotor;
  (d) hydraulic cylinder means arranged to act between the assembly of bearing blocks and the pedestal;
  (e) at least one hydraulic cylinder, part of the hydraulic cylinder means, disposed below the assembly of bearing blocks and arranged to support the bearing blocks and rotor against vertically downwardly directed forces;
  (f) anchoring means connecting the assembly to the pedestal and anchoring the assembly against horizontal transverse movement; and
  (g) the anchoring means being sufficiently resilient to permit vertical displacements of the assembly but to prohibit horizontal transverse movements.

2. A rotary machine according to claim 1, in which the anchoring means are in the form of a horizontally arranged plate.

3. A rotary machine according to claim 2, in which the plate is disposed in or adjacent a horizontal plane containing the axis of the rotor.

4. A rotary machine according to claim 1, in which means are provided by which the effective volume of the hydraulic cylinder means can vary automatically; whereby in use the effective volume of the cylinder can change automatically to permit that cylinder to accommodate increased vibrational forces in the rotor.

5. A rotary machine according to claim 4, in which
  (a) an axial end wall closes the end of the cylinder remote from the bearing assembly;
  (b) the axial end wall includes a stiff metal diaphragm;
  (c) a further liquid-filled space is defined by the diaphragm and by other rigid walls;
  (d) a source of liquid is connected to the inside of the cylinder by a liquid flow path of relatively high fluid impedance; and
  (e) the source of liquid is connected to the inside of the further liquid-filled space by a liquid flow path of relatively low fluid impedance;
whereby in use the sustained forces can cause such a liquid flow into or out of the liquid space of the cylinder as to equalize or substantially equalize the liquid pressures respectively on the two sides of the diaphragm, while the vibrational forces are incapable of effecting substantial liquid flow to and from the liquid space of the cylinder, so that the diaphragm exerts a force tending to counteract these vibrational forces.

6. A rotary machine according to claim 4, in which the liquid space of the cylinder includes a gas containing enclosure;
  whereby in use for a given displacement of the piston in that cylinder the change in pressure in the liquid space is considerably reduced.

7. A rotary machine according to claim 6, in which a restricted passage connects the gas-containing enclosure to the remainder of the liquid space of the cylinder so that in use fluid friction provides damping of the flow of liquid into and out of the gas-containing enclosure.

References Cited

UNITED STATES PATENTS

| | | | |
|---|---|---|---|
| 1,306,653 | 6/1919 | Wingfield | 308—26 |
| 1,498,535 | 6/1924 | Bartholomew | 308—141 |
| 1,683,351 | 9/1928 | Herr | 308—26 |
| 3,110,526 | 11/1963 | Sternlicht | 308—73 |

FOREIGN PATENTS 937,234  12/1955  Germany.

MARTIN P. SCHWADRON, *Primary Examiner.*

FRANK SUSKO, *Examiner.*